STEREOPHONIC SOUND RECORDING AND REPRODUCTION

Filed Oct. 20, 1958 2 Sheets-Sheet 1

INVENTOR
NICO VALENTINUS FRANSSEN
HERBERT MENSEN
BY
Frank R. Jifani
AGENT

INVENTOR
NICO VALENTINUS FRANSSEN
HERBERT MENSEN
BY
Frank R. Trifari
AGENT 3,070,669
Patented Dec. 25, 1962

3,070,669

STEREOPHONIC SOUND RECORDING AND REPRODUCTION

Nico Valentinus Franssen and Herbert Mensen, Eindhoven, Netherlands, assignors to North American Philips Company Inc., New York, N.Y., a corporation of Delaware Filed Oct. 20, 1958, Ser. No. 768,444
Claims priority, application Netherlands Oct. 21, 1957
5 Claims. (Cl. 179—100.2)

The present invention relates to methods of recording and/or reproducing sound signals more particularly tones or sounds by means of a number of recording and/or reproducing elements. The term "reproducing elements" is to be understood to include both magnetic reproducing heads and loudspeakers, while the term "recording elements" is to be understood to mean in particular magnetic recording heads.

The present invention has the feature that the start and the interruption of the various sound signals are taken from and supplied respectively to one or more of the elements, which may be stereophonically associated, while the remainder of said sound signals is taken from and supplied respectively to one or more of the remaining elements.

The invention is based on the recognition that only the start and the interruption of a sound signal are responsible for obtaining an impression of the direction of the signal, while the remainder is of importance only for the signal strength as such. Hence, the remainder does not contribute in determining the direction of the sound, but has a wholly diffuse character. It is thus possible to obtain a certain directivity in reproducing sound by supplying to the reproducing element concerned only the start and the interruption of the signals to be reproduced, while the remainder may be supplied to arbitrary reproducing elements. In conventional methods, this directivity in reproducing sound was previously secured by supplying the whole signal (start, interruption and remainder) to the reproducing element concerned, the directivity in this case resulting from different arrival times at the ears of a listener.

The directivity phenomenon according to the invention permits stereophonic recording, for example of an orchestra, by recording the sound signals in a number of tracks of a magnetic record carrier. The sound signals received by a number of microphones disposed in front of an orchestra are supplied to a number of recording heads, these stereophonically associated signals being recorded in a corresponding number of tracks. For this purpose, the area occupied by the orchestra may be divided into a number of sectors and, in accordance with the invention, the sound produced in a given sector is recorded partially in the stereophonic track concerned and partially in a preferably common track. For complex orchestra pieces, it is not always possible during the performance to record the different parts into which the sound can be divided according to the invention. Short-duration transients of certain instruments might be lost and therefore localized at locations where they do not actually occur. In order to insure that the correct location of each instrument of the assembly of the orchestra is well represented in reproducing the record, the tracks in which the start and the interruption of the various sound signals are recorded each comprise a control signal present in the carrier. Alternatively, the control signal may be present in an auxiliary carrier.

When using the method according to the invention for reproducing sound signals by means of a magnetic delay system comprising a record carrier along which one or more recording heads and a number of reproducing heads are disposed, the latter being connected to a number of loudspeakers distributed along the boundaries of the reproduction space, localizaton at one of the loudspeakers or loudspeaker groups is obtainable accordingly by splitting up the signals and by supplying to said loudspeakers only the start and the interruption of the sound signals to be reproduced. This has the advantage that a listener in the immediate proximity of any of the loudspeakers distributed in the hall will not hear the sound from this loudspeaker since the sound in the auditorium is diffuse. Hitherto, only listeners at the centre of a hall could be given the impression that, when localizing the sound image at, say, the stage, the sound comes from the front and the sound from the other loudspeakers comes from all sides, so that the last-mentioned sound was diffuse. Use of the present invention allows all the listeners in a hall to have the impression of localization amidst a diffuse sound image. Moreover, the adjustment of the delays obtained by means of the reproducing heads and with which the signals which have only the signal remainder are scanned by these heads, is no longer critical as was required for diffusing the sound radiated by the loudspeakers associated with the reproducing heads.

In a particular form of the method according to the invention, only the remainder of the signals is recorded on the magnetic carrier, while the start and the interruption of the signals are directly supplied to the loudspeaker or group of loudspeakers to be localized. In this case double-track or multi-track recording, when giving up stereophonic recording, is superfluous. The effect of the direct reproduction is that of a localized sound image in the midst of diffuse sound. It will be clear that this result is obtained with a minimum number of magnetic heads. Since the start and the interruption of a signal may be phenomena of very short duration (for example 15 msec.), and the remainder may in many cases be a phenomenon of longer duration, the record of the remainder thus made may later be employed for a variety of purposes, since it contains each signal substantially intact.

In order that the invention may be readily carried into effect, a few examples will now be described in detail with reference to the accompanying drawing in which FIG. 1 is a schematic representation of a signal split up into three constituent parts in accordance with the invention.

Figure 1:
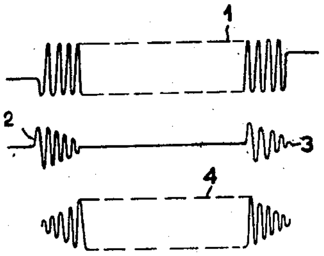

In FIG. 1, the reference numeral 1 designates the signal which is the sum of three parts into which it is divided in accordance with the invention, namely the start or head 2, the interruption or tail 3 and the remainder or middle-part 4. In accordance with the invention, the head and the tail of a signal—which must not be confused with transient phenomena—are determinative for perceiving the direction from which the sound is coming. If, for example, the parts 2 and 3 are supplied to a loudspeaker A and the middle-part 4 is supplied to another loudspeaker B (these loudspeakers are not shown in the drawing), the listener will have the impression that the whole signal is radiated by the loudspeaker A. Yet, the loudspeaker A is silenced after, say, 15 msec., while the middle-part is reproduced for, say, 4 seconds, by the loudspeaker B.

It will now be evident that the form to be given to said parts may be quite arbitrary, provided that a start can be thought of only if a "start" is actually present, that is to say domination over the "start" of the remainder 4. Similarly, interruption can be spoken of only if such an "interruption" dominates over the "end" of the intermediate part 4.

Figure 2:
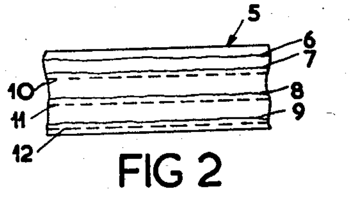
FIG. 2 is a stereophonic record according to the invention on a magnetic carrier and comprising control signals.

FIG. 2 shows a magnetic record carrier 5 on which the parts of the signals from, for example, an orchestra are recorded in a number of tracks 6 to 9; the signals are split up in accordance with the invention. The intermediate parts 4, shown in FIG. 1, of the various signals are all recorded in track 6 and the start and the end 2 and 3 respectively shown in FIG. 1, of each signal depending upon the microphone picking up the signals from a given part of the area occupied by the orchestra, either in track 7 or in tracks 8 or 9. In order that upon subsequent reproduction of this record each sound corresponds to the location where the initial sound has been produced in the orchestra, each of these stereophonically associated tracks 7 to 9 comprises a control signal 10 to 12 permitting to obtain a correct image of the initial direct reproduction of the orchestra.

Figure 3:
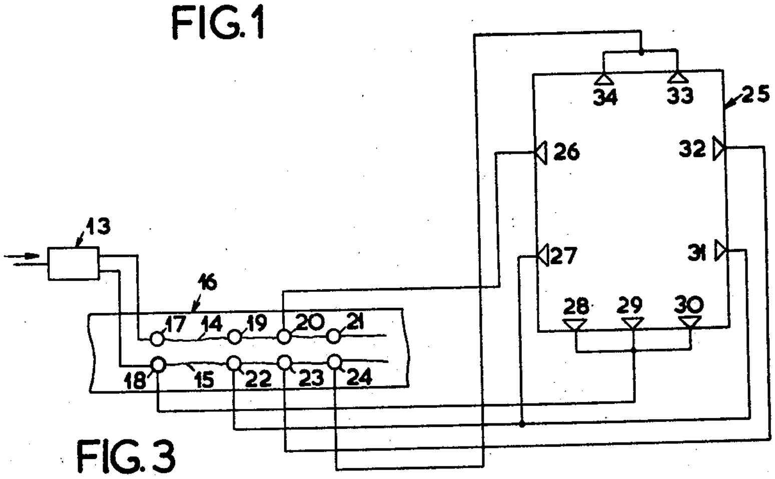
FIG. 3 illustrates a reproduction hall in which the mehtod according to the invention permits localization amidst a diffuse sound image.

In FIG. 3, after splitting up the incoming signal in a device 13, the parts 2 and 3 and the part 4, shown in FIG. 1, are recorded in the two tracks 14 and 15 respectively of the magnetic record carrier 16 by means of recording heads 17 and 18 respectively. The track 14 can be successively scanned by three reproducing heads 19, 20 and 21, while the track 15 is scanned by reproducing heads 22 to 24. Appropriate disposition of the reproducing heads 19 to 24 along the tracks permits localization, if desired variable, amid a diffuse sound image on reproducing the scanned signals, by connecting one of the heads 19 to 21 to the loudspeaker(s) to be localized in the reproduction space 25 and by connecting the reproducing heads 22 to 24 disposed along the track 15 to the remaining loudspeakers. In the present example, the reproducing head 20 is connected to a loudspeaker 26 radiating the sound in a directional manner. Since the remaining loudspeakers 27 to 34, the loudspeakers 28 to 30 of which are disposed at the front of the reproduction space, reproduce only diffuse sound, localization amidst a diffuse sound image is thus established by the method according to the invention.

Figure 4:
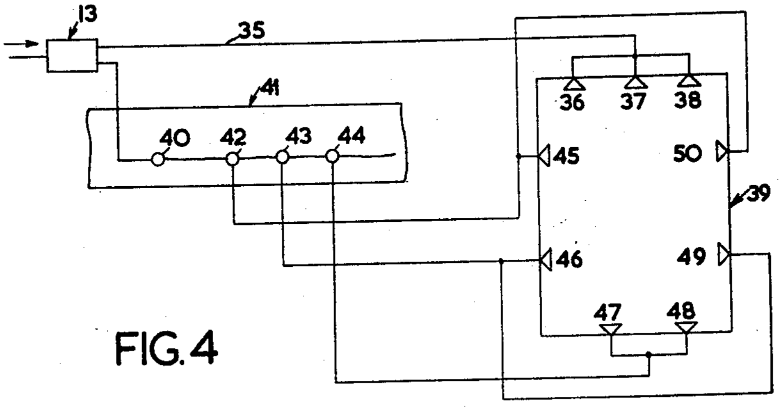
FIG. 4 shows a simplified modification of FIG. 3.

FIG. 4 shows a similar array as shown in FIG. 3 except that the channel 35 comprising the parts 2 and 3 shown in FIG. 1 is directly connected to loudspeakers 36 to 38 disposed at the front of the reproduction space 39. In this instance, the directional sound is reproduced at the front of the reproduction space, while the various remaining parts 4 shown in FIG. 1 are recorded by means of a recording head 40 on the record carrier 41 and scanned by reproducing heads 42 to 44. These scanned signals, which represent the diffuse sound, are radiated by the remaining loudspeakers 45 to 50 distributed over the reproduction space. In this manner, localization is established also in this instance amidst a diffuse sound image, but this result is obtained with half the number of heads employed in the method illustrated in FIG. 3. The record carrier 41 contains, it is true, only the part 4 shown in FIG. 1. Yet it can be employed later as an independent record for reproducing the substantially intact signals recorded therein. Alternatively, this record may be re-scanned and the scanned signal may in accordance with the invention again be split up, into direction-determining and non-direction-determining constituents.

Figure 5:
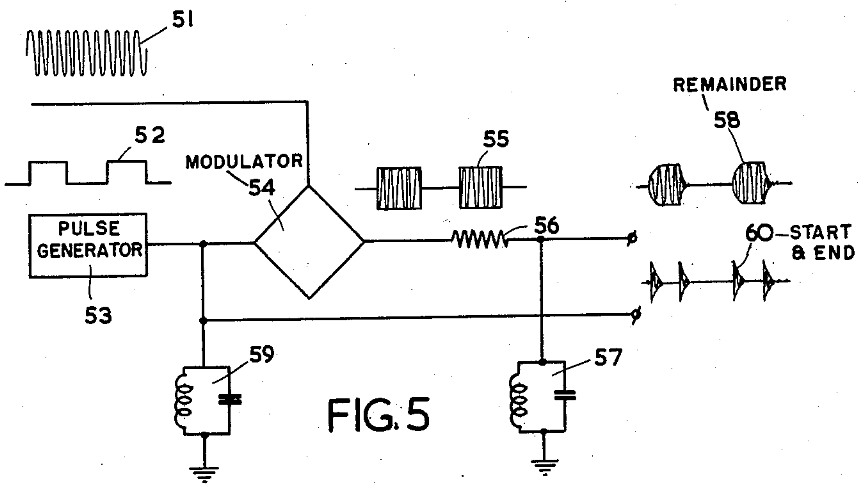
FIGS. 5 and 6 show a circuit arrangement for dividing a signal into separate parts determinative of direction and signal strength.

Splitting up a sinus tone in said parts, as occurs in the device 13 shown in FIGS. 3 and 4, may be effected in various ways. One of them is illustrated e.g. in FIG. 5. The tone 51 to be split up is modulated in a modulator 54 with a pulsatory signal 52 from a pulse generator 53. The modulated signal 55 is subsequently supplied through a resistor 56 to a tuned oscillatory circuit 57. As a result of building up there is produced across this oscillatory circuit a signal 58 whose form resembles the signal 4 shown in FIG. 1. On the other hand the pulsatory signal 52 from the pulse-generator 53 is also directly supplied to a tuned oscillatory circuit 59. Also here, due to building up, deformation of the initial pulsatory signal occurs and a signal 60 is produced across the oscillatory circuit the form of which signal resembles that of the signal 2 shown in FIG. 1.

If the frequency of the tone varies, the resonance-frequency of the oscillatory circuits is also to be tuned to a different value. Such tuning may be effected automatically under the influence of a voltage difference derived from the frequency difference, conversion of the frequency difference into a voltage difference being effected by means of a synchronous detector.

Figure 6:
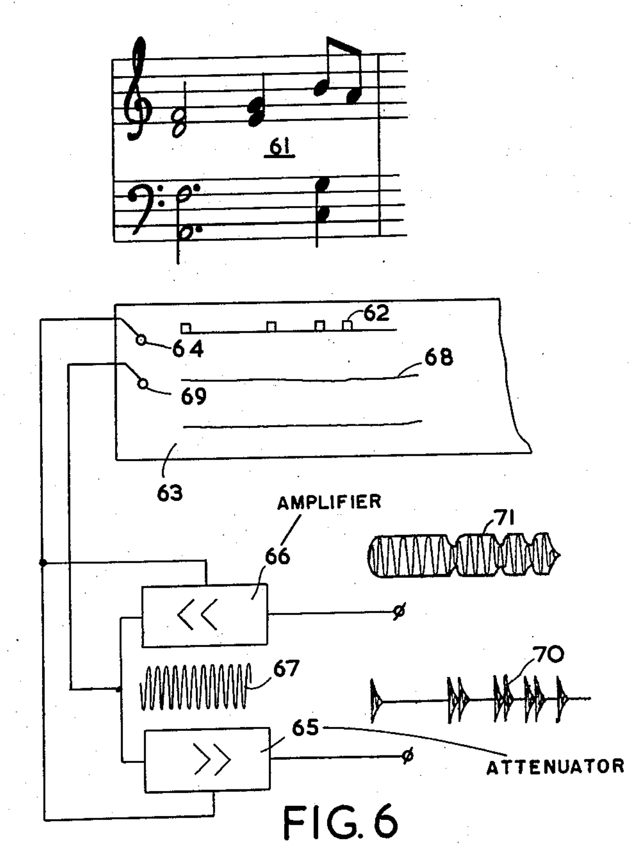

A different way is, for example, shown in FIG. 6. First, the score 61 of a composition is recorded in the form of clock signals 62 on magnetic tape 63, that is a clock signal having a duration of, for example, 15 msec. is recorded on the tape whenever a new chord appears in the score. The relative spacing of the clock signals has been brought into agreement with the duration of the various chords. After the whole of the score has thus been translated into magnetic clock signals, this track 62 is scanned by a reproducing head 64 and the electric signal thus produced is supplied both to an attenuator 65 and to an amplifier 66. The initial signal 67 has naturally been recorded in known manner in a track 68 of the magnetic carrier 63 and, after scanning by reproducer head 69, is supplied both to the attenuator 65 and to the amplifier 66. This means that the signal is distributed over two channels, one channel comprising the attenuator and the other channel comprising the amplifier. The attenuator and the amplifier become operative only on producing the electric signal derived from the magnetic clock signals. The attenuation is of such nature that the amplitude of the sound present in the relative channel is reduced to zero within 15 msec. while the amplification is such that the amplitude of the sound in the relative second channel is adjusted from zero to the initial amplitude within 15 msec. In this manner, the same forms 70 and 71 respectively of the signal are obtained as represented by 2 and 4 respectively for a single oscillation in FIG. 1.

The specific embodiments have been shown and described by way of example; it will, of course, be understood that various modifications may be devised by those skilled in the art which will embody the principles of the invention, the scope of which is set forth in the appended claims.

What is claimed is:

1. A method of reproducing sound signals comprising: separating a sound signal to be reproduced into start, interruption and intermediate components, applying said start and interruption components to a first reproduction device and feeding the intermediate components to a plurality of other reproduction devices, whereby said first reproduction device gives an impression of sound localization while the other reproduction devices give an impression of sound diffusion.

2. A method of reproducing sound signals comprising: separating a sound signal to be reproduced into start, interruption and intermediate components, applying said start and interruption components to a first group of transducers and feeding the intermediate components to a second group of transducers, whereby said first group gives an impression of sound localization and the second group gives an impression of sound diffusion.

3. A method of reproducing sound signals comprising: separating a sound signal to be reproduced into start, interruption and intermediate components, applying said start and interruption components directly to a loudspeaker, thereby obtaining localized sound therefrom, feeding said intermediate components to a magnetic recording head co-acting with a moving magnetic record carrier, reproducing the intermediate component signals from siad record carrier with a plurality of reproducing heads, and applying the intemediate signals to a plurality of loudspeakers thereby obtaining diffuse sound therefrom.

4. A method of reproducing sound signals comprising: separating a sound signal to be reproduced into start, interruption and intermediate components, applying said start and interruption components to a first magnetic recording head co-acting with a moving magnetic record carrier, applying said intermediate component to a second magnetic recording head co-acting with said record carrier, reproducing the start and interruption components from said carrier and applying said components to a first loudspeaker, and reproducing said intermediate component from said carrier and applying said component to a plurality of loudspeakers, whereby said first loudspeaker localizes the sound and said plurality of loudspeakers produce diffuse sound.

5. A method as claimed in claim 4, further comprising the step of recording a plurality of control signals on said magnetic tape, said control signals corresponding with the times of said start and interruption components.

References Cited in the file of this patent

UNITED STATES PATENTS

| | | |
|---|---|---|
| 2,419,894 | Hayes | Apr. 29, 1947 |
| 2,819,348 | Bogert | Jan. 7, 1958 |

OTHER REFERENCES

Acoustical Engineering, Olson, copyright 1957, pages 577–578, Van Nostrand, pub.

Vermeulen: "Stereo-Reverberation," Journal of the Audio Engineering Society, April 1958, vol. 6, No. 2, pages 124–130 (effective date: October 9, 1957).